(12) United States Patent
Magnuson et al.

(10) Patent No.: US 7,099,980 B1
(45) Date of Patent: Aug. 29, 2006

(54) DATA STORAGE SYSTEM HAVING PORT DISABLE MECHANISM

(75) Inventors: Brian D. Magnuson, Somerville, MA (US); Mark Botelho, South Easton, MA (US); Daniel Castel, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 403 days.

(21) Appl. No.: 10/740,220

(22) Filed: Dec. 18, 2003

(51) Int. Cl.
*G06F 13/00* (2006.01)
*G06F 12/00* (2006.01)

(52) U.S. Cl. ...................... 710/301; 711/148
(58) Field of Classification Search ........ 710/300–302, 710/316, 317; 711/148–150; 709/203, 214
See application file for complete search history.

(56) References Cited

U.S. PATENT DOCUMENTS

| | | | | |
|---|---|---|---|---|
| 5,214,769 A | * | 5/1993 | Uchida et al. | 711/151 |
| 5,623,698 A | * | 4/1997 | Stephenson et al. | 710/38 |
| 5,765,188 A | * | 6/1998 | Cowell | 711/115 |
| 5,819,104 A | * | 10/1998 | Tuccio | 710/2 |
| 6,230,217 B1 | * | 5/2001 | Tuccio et al. | 710/8 |
| 6,230,221 B1 | * | 5/2001 | Mulvey et al. | 710/62 |
| 2004/0221112 A1 | * | 11/2004 | Greenfield | 711/148 |

* cited by examiner

*Primary Examiner*—Rehana Perveen
*Assistant Examiner*—Trisha Vu

(57) ABSTRACT

A system interface having a backplane adapted to have plugged therein director boards and memory boards. Each one of such director boards includes director board transmit/receive units. Each one of the director board transmit/receive units is associated with a corresponding one of the of memory boards. Each one of the director board transmit/receive units is adapted to be disabled in the absence of the one of the memory boards associated with such one of the director board transmit/receive units. Each one of the memory boards includes memory board transmit/receive units. Each one of the memory board transmit/receive units is associated with a corresponding one of the director boards. Each one of the memory board transmit/receive units is adapted to be disabled to prevent transmit/receive data therethrough in the absence of the one of such director boards associated with such one of the memory board transmit/receive units.

7 Claims, 6 Drawing Sheets

DATA STORAGE SYSTEM HAVING PORT DISABLE MECHANISM

INCORPORATION BY REFERENCE

This application incorporates by reference, in their entirety, the following co-pending patent applications all assigned to the same assignee as the present invention:

| INVENTORS | FILING DATE | Ser. No. | TITLE |
|---|---|---|---|
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 | Data Storage System Having Point-To-Point Configuration |
| John K. Walton et al. | Jan. 22, 2002 | 10/054,241 | Data Storage System (Divisional of 09/223,519 filed Dec. 30, 1998) |
| Christopher S. MacLellan et al. | Dec. 21, 2000 | 09/745,859 | Data Storage System Having Plural Fault Domains |
| John K. Walton | May 17, 2001 | 09/859,659 | Data Storage System Having No-Operation Command |
| Ofer Porat et al | Mar. 31, 2003 | 10/403,262 | Data Storage System |

TECHNICAL FIELD

This invention relates generally to data storage system, and more particularly to data storage systems having director boards and memory boards interconnected through a backplane and for selectively disabling ports on the director boards and memory boards.

BACKGROUND

As is known in the art, large host computers and servers (collectively referred to herein as "host computer/servers") require large capacity data storage systems. These large computer/servers generally include data processors which perform many operations on data introduced to the host computer/server through peripherals including the data storage system. The results of these operations are output to peripherals, including the storage system.

[One type of data storage system is a magnetic disk storage system. Here a bank of disk drives and the host computer/server are coupled together through an interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (sometimes also referred to as directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

The host computer/server controllers, disk controllers and cache memory are interconnected through a backplane printed circuit board (i.e., backplane). More particularly, disk controllers are mounted on disk controller printed circuit boards. The host computer/server controllers are mounted on host computer/server controller printed circuit boards. And, cache memories are mounted on cache memory printed circuit boards. The disk directors, host computer/server directors, and cache memory printed circuit boards plug into the backplane.

SUMMARY

In accordance with the present invention, a data storage system is provided for transferring data between a host computer/server and a bank of disk drives through a system interface. The system interface includes a backplane adapted to have plugged therein a plurality of director boards and a plurality of memory boards. Each one of such director boards includes a plurality of director board transmit/receive units. Each one of the director board transmit/receive units is associated with a corresponding one of the plurality of memory boards. Each one of the director board transmit/receive units is adapted to be disabled in the absence of the one of the memory boards associated with such one of the director board transmit/receive units. Each one of the memory boards includes a plurality of memory board transmit/receive units. Each one of the memory board transmit/receive units is associated with a corresponding one of the plurality of director boards. Each one of the memory board transmit/receive units is adapted to be disabled to prevent transmit/receive data therethrough in the absence of the one of such director boards associated with such one of the memory board transmit/receive units.

The details of one or more embodiments of the invention are set forth in the accompanying drawings and the description below. Other features, objects, and advantages of the invention will be apparent from the description and drawings, and from the claims.

DESCRIPTION OF DRAWINGS

These and other features of the invention will become more readily apparent from the following detailed description when read together with the accompanying drawings, in which.

Like reference symbols in the various drawings indicate like elements.

DETAILED DESCRIPTION

Figure 1:
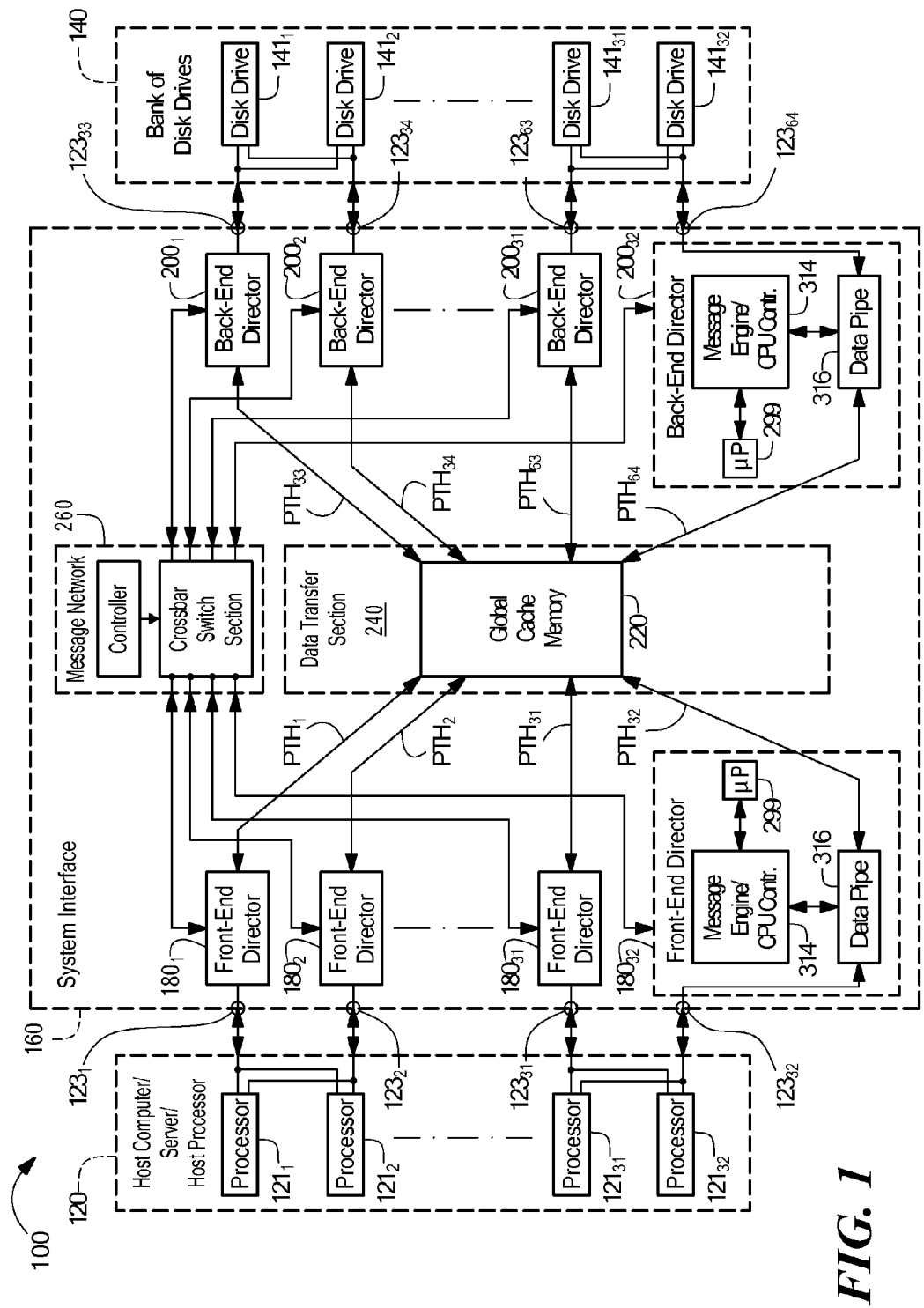
FIG. 1 is a block diagram of a data storage system according to the invention.

Referring now to FIG. 1, a data storage system 100 is shown for transferring data between a host computer/server 120 and a bank of disk drives 140 through a system interface 160. The system interface 160 includes: a plurality of, here 32 front-end directors $180_1$–$180_{32}$ coupled to the host computer/server 120 via ports $123_1$–$123_{32}$; a plurality of back-end directors $200_1$–$200_{32}$ coupled to the bank of disk drives 140 via ports $123_{33}$–$123_{64}$; a data transfer section 240, having a global cache memory 220, coupled to the plurality of front-end directors $180_1$–$180_{16}$ and the back-end directors $200_1$–$200_{16}$; and a messaging network 260, operative independently of the data transfer section 240, coupled to the plurality of front-end directors $180_1$–$180_{32}$ and the plurality of back-end directors $200_1$–$200_{32}$, as shown. The front-end and back-end directors $180_1$–$180_{32}$, $200_1$–$200_{32}$ are functionally similar and include a microprocessor (µP) 299 (i.e., a central processing unit (CPU) and RAM), a message engine/CPU controller 314 and a data pipe 316, described in detail in the co-pending patent applications referred to above. Suffice it to say here, however, that the front-end and back-end directors $180_1$–$180_{32}$, $200_1$–$200_{32}$ control data transfer between the host computer/server 120 and the bank of disk drives 140 in response to messages passing between the directors $180_1$–$180_{32}$, $200_1$–$200_{32}$ through the messaging network 260. The messages facilitate the data transfer between host computer/server 120 and the bank of disk drives 140 with such data passing through the global cache memory 220 via the data transfer section 240.

It is noted that in the host computer 120, each one of the host computer processors $121_1$–$121_{32}$ is coupled to here a pair (but not limited to a pair) of the front-end directors $180_1$–$180_{32}$, to provide redundancy in the event of a failure in one of the front end-directors $181_1$–$181_{32}$ coupled thereto. Likewise, the bank of disk drives 140 has a plurality of, here 32, disk drives $141_1$–$141_{32}$, each disk drive $141_1$–$141_{32}$ being coupled to here a pair (but not limited to a pair) of the back-end directors $200_1$–$200_{32}$, to provide redundancy in the event of a failure in one of the back-end directors $200_1$–$200_{32}$ coupled thereto). Thus, front-end director pairs $180_1$, $180_2$; . . . $180_{31}$, $180_{32}$ are coupled to processor pairs $121_1$, $121_2$; . . . $121_{31}$, $121_{32}$, respectively, as shown. Likewise, back-end director pairs $200_1$, $200_2$; . . . $200_{31}$, $200_{32}$ are coupled to disk drive pairs $141_1$, $141_2$; . . . $141_{31}$, $141_{32}$, respectively, as shown.

Figure 2:
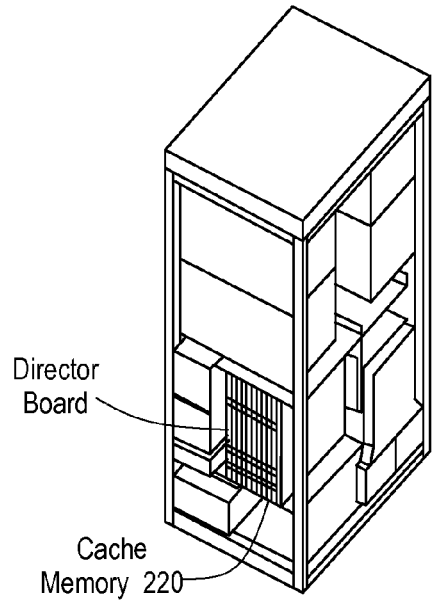
FIG. 2 is a sketch of an electrical cabinet storing a system interface used in the data storage system of FIG. 1.
Figure 3:
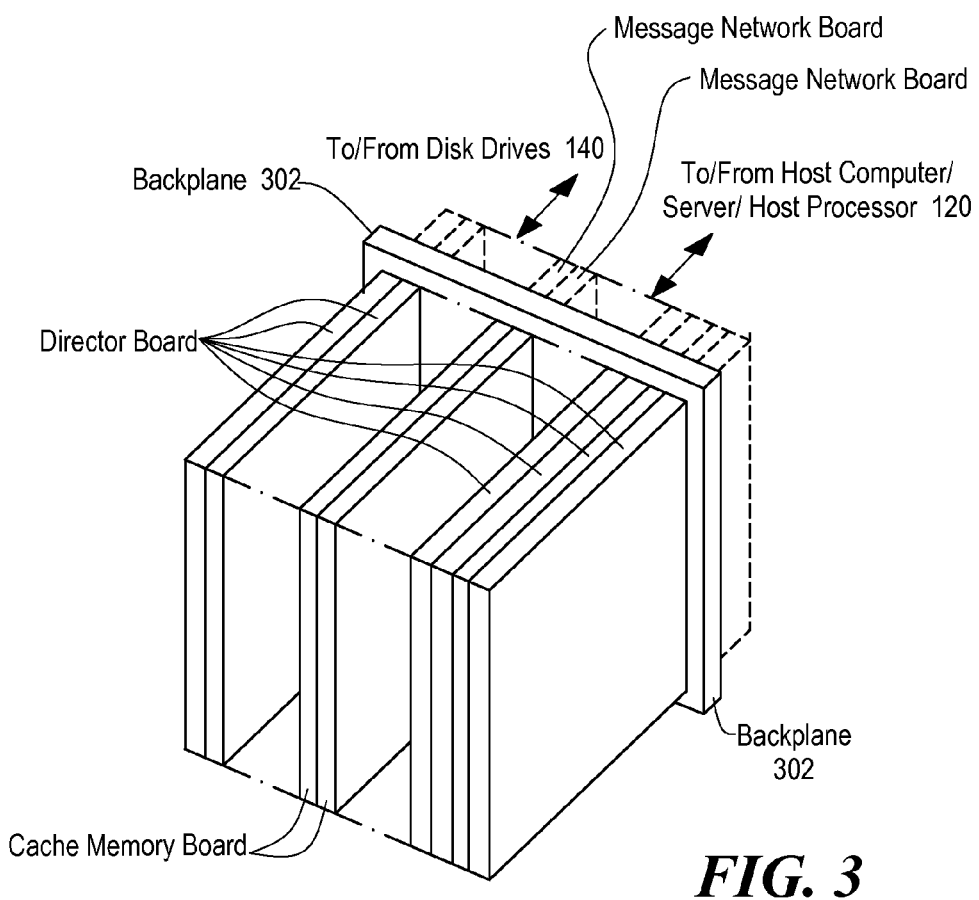
FIG. 3 is a diagramatical, isometric sketch showing printed circuit boards providing the system interface of the data storage system of FIG. 1.

Referring now to FIGS. 2, and 3, the system interface 160 is shown to include an electrical cabinet 300 having stored therein: a plurality of, here eight front-end director boards $190_1$–$190_8$, each one having here four of the front-end directors $180_1$–$180_{32}$; a plurality of, here eight back-end director boards $210_1$–$210_8$, each one having here four of the back-end directors $200_1$–$200_{32}$; and a plurality of, here eight, memory boards M0–M7 which together make up the global cache memory 220. These boards plug into the front side of a backplane 302 (FIG. 3) (It is noted that the backplane 302 is a mid-plane printed circuit board). Plugged into the backside of the backplane 302 are message network boards which together make up the message network 260 as described in the co-pending patent applications referred to above. The backside of the backplane 302 has plugged into it adapter boards, not shown in FIGS. 2–4, which couple the boards plugged into the back-side of the backplane 302 with the computer 120 and the bank of disk drives 140 as shown in FIG. 1.

That is, referring again briefly to FIG. 1, an I/O adapter, not shown, is coupled between each one of the front-end (FE) directors $180_1$–$180_{32}$ and the host computer 120 and an I/O adapter, not shown, is coupled between each one of the back-end (BE) directors $200_1$–$200_{32}$ and the bank of disk drives 140.

Figure 4:
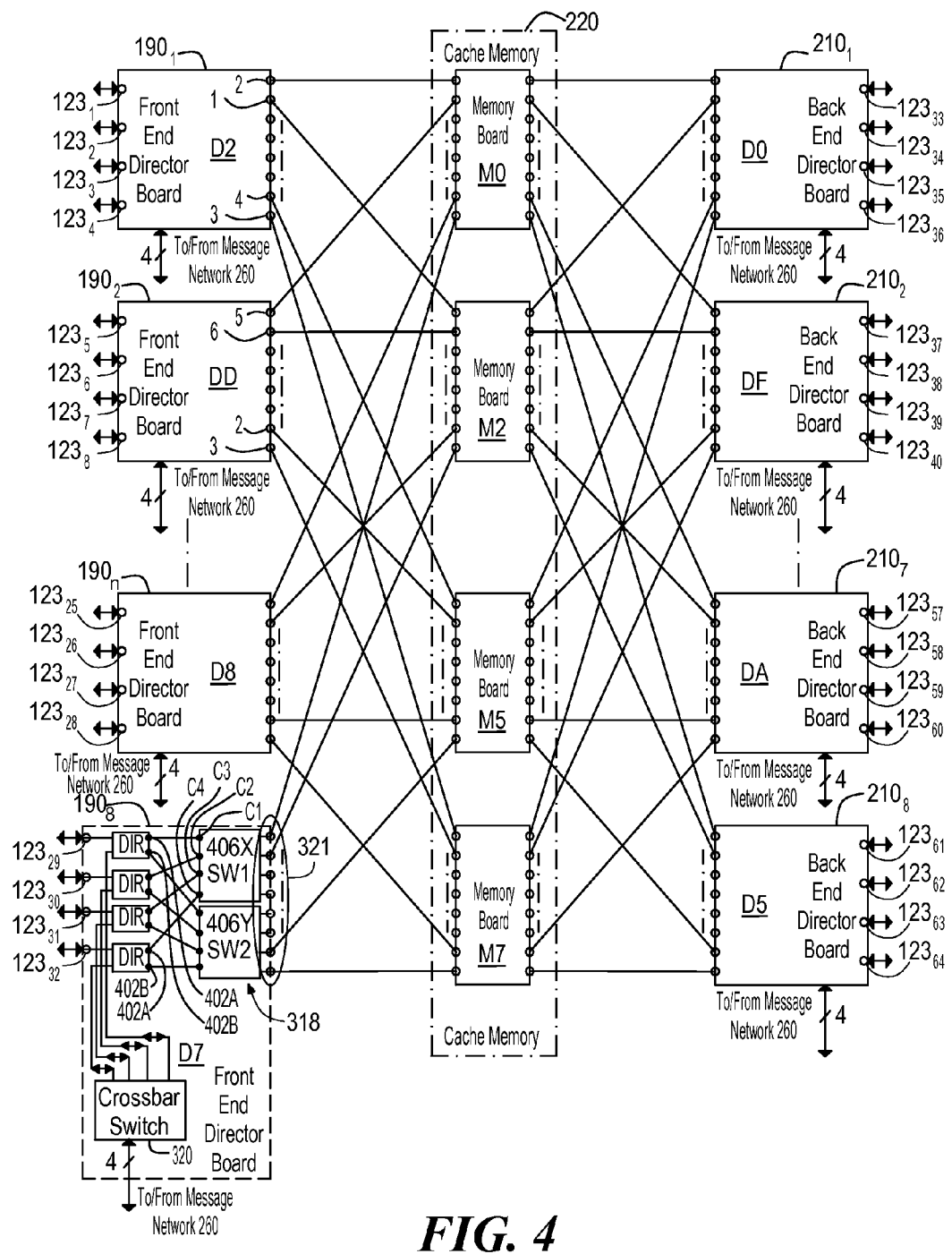
FIG. 4 is a block diagram of the system interface used in the data storage system of FIG. 1.

Referring now to FIG. 4, and as described in more in the co-pending patent applications referred to above, each one of the director boards $190_1$–$210_8$ includes, as noted above four of the directors $180_1$–$180_{32}$, $200_1$–$200_{32}$ (FIG. 1). It is noted that the director boards $190_1$–$190_8$ having four front-end directors per board, $180_1$–$180_{32}$ are referred to as front-end directors and the director boards $210_1$–$210_8$ having four back-end directors per board, $200_1$–$200_{32}$ are referred to as back-end directors. Each one of the directors $180_1$–$180_{32}$, $200_1$–$200_{32}$ includes the microprocessor 299 referred to above, the message engine/CPU controller 314, and the data pipe 316 shown in FIG. 1.

The front-end director boards have ports $123_1$–$123_{32}$, as shown in FIG. 1, coupled to the processors $121_1$–$121_{32}$, as shown. The back-end director boards have ports $123_{33}$–$123_{64}$, as shown in FIG. 2, coupled to the disk drives $141_1$–$141_{32}$, as shown.

Each one of the director boards $190_1$–$210_8$ includes a crossbar switch 318 as shown in FIG. 4. The crossbar switch 318 has eight input/output ports $C_1$–$C_8$, each one being coupled to the data pipe 316 (FIG. 1) of a corresponding one of the four directors $180_1$–$180_{32}$, $200_1$–$200_{32}$ on the director board $190_1$–$210_8$. The crossbar switch 318 has eight output/input ports collectively identified in FIG. 4 by numerical designation 321 (which plug into the backplane 302). The crossbar switch 318 on the front-end director boards $191_1$–$191_8$ is used for coupling the data pipe 316 of a selected one of the four front-end directors $180_1$–$180_{32}$ on the front-end director board $190_1$–$190_8$ to the global cache memory 220 via the backplane 302 and I/O adapter, not shown. The crossbar switch 318 on the back-end director boards $210_1$–$210_8$ is used for coupling the data pipe 316 of a selected one of the four back-end directors $200_1$–$200_{32}$ on the back-end director board $210_1$–$210_8$ to the global cache memory 220 via the backplane 302 and I/O adapter, not shown. Thus, referring to FIG. 1, the data pipe 316 in the front-end directors $180_1$–$180_{32}$ couples data between the host computer 120 and the global cache memory 220 while the data pipe 316 in the back-end directors $200_1$–$200_{32}$ couples data between the bank of disk drives 140 and the global cache memory 220. It is noted that there are separate point-to-point data paths $PTH_1$–$PTH_{64}$ (FIG. 1) between each one of the directors $180_1$–$180_{32}$, $200_1$–$200_{32}$ and the global cache memory 220. It is also noted that the backplane 302 is a passive backplane because it is made up of only etched conductors on one or more layers of a printed circuit board. That is, the backplane 302 does not have any active components.

Further, as described in the co-pending patent applications referred to above, crossbar switch 320 (FIG. 4) plugs into the backplane 302 and is used for coupling to the directors to the message network 260 (FIG. 1) through the backplane.

Figure 5:
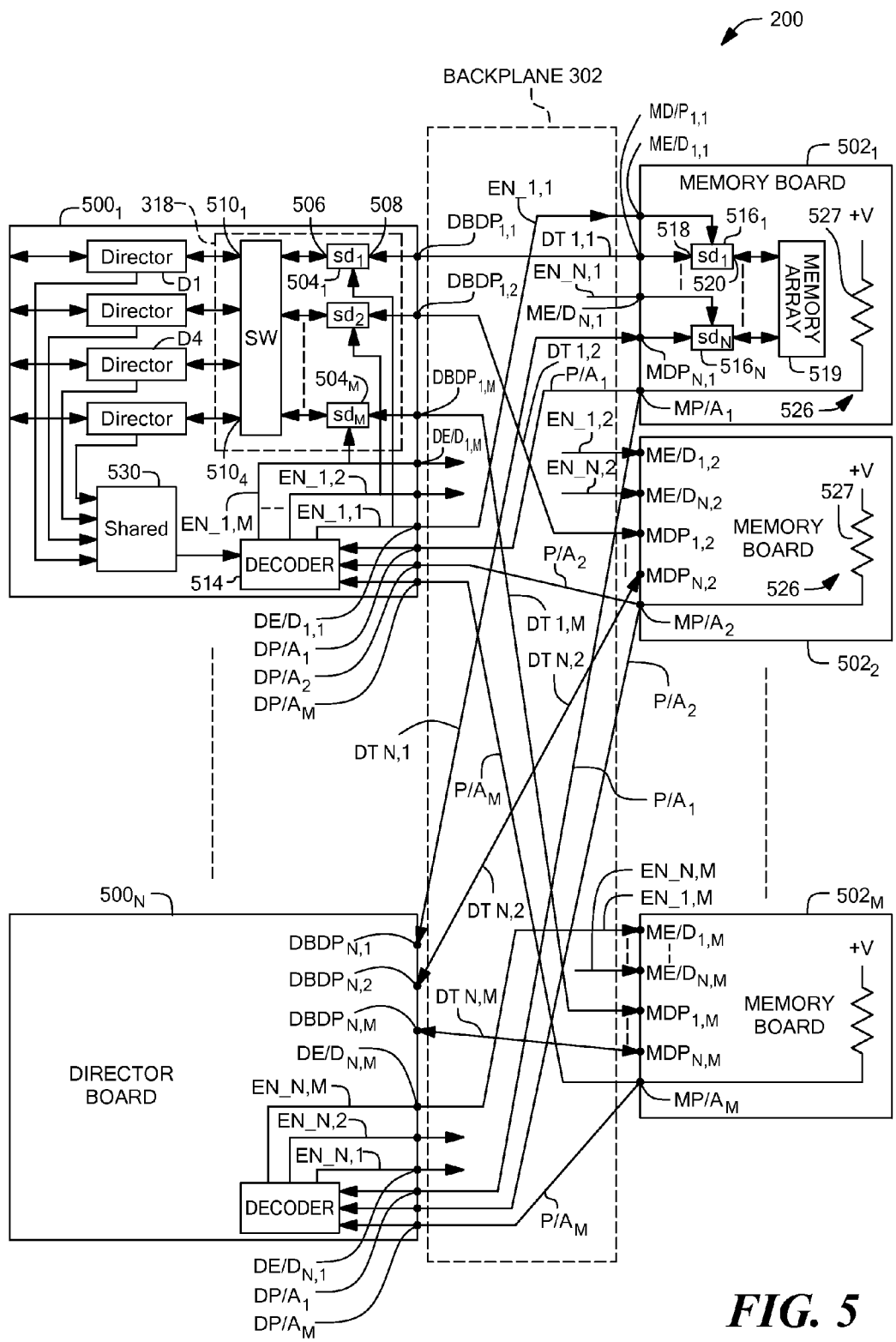
FIG. 5 is a diagram of a system according to the invention, such system having an arrangement of memory boards and director boards interconnected through a backplane and for selectively disabling ports on the director boards and memory boards according to the invention.

Referring now to FIG. 5, a portion of the system interface 200 is shown. Thus, as described above, the backplane 302 is adapted to have plugged therein a plurality of, N, here 16, director boards $190_1$–$190_8$, $210_1$–$210_8$ and a plurality of, M, here 8, memory boards M0–M7, FIG. 4, here, in FIG. 5, the director boards $190_1$–$190_8$, $210_1$–$210_8$ are designated as $500_1$–$500_N$, respectively, and the memory boards M0–M7 are designated as $502_1$–$502_M$, respectively.

Each one of such director boards $500_1$–$500_N$, is identical in construction. An exemplary one thereof, here director board $500_1$, is shown to include a plurality of, here four, of the directors $180_1$–$180_{32}$, $200_1$–$200_{32}$, (FIG. 4) here, in FIG. 5, such four directors are designated as directors D1–D4 and a plurality of, M, director board transmit/receive units $504_1$–$504_M$, here serial-parallel devices (i.e., SERDES) $sd_1$–$sd_M$, as shown. Each one of the director board transmit/receive units $504_1$–$504_M$ is associated with a corresponding one the M director boards $502_1$–$502_M$. Each one of the director board transmit/receive units $504_1$–$504_M$ has a first unit port 506 and a second unit port 508. Each one of the director boards $500_1$–$500_N$ also includes a crossbar switch 318 as described above in connection with FIG. 4.

The crossbar switch 318 includes: (i) a plurality of first switch ports $510_1$–$510_4$, each one of the first switch ports $510_1$–$510_4$ being coupled to a corresponding one of the directors D1–D4, respectively; and (ii) a plurality of, M, second switch ports $512_1$–$512_M$. Each one of the second switch ports $512_1$–$512_M$ is coupled to the first unit port 506 of a corresponding one of the director board transmit/receive units $504_1$–$504_M$ on the director board $500_1$.

Each one of the director boards $500_1$–$500_M$ also includes a plurality of, M, director board data ports DBDPs. Thus, director boards $500_1$ through $500_N$ have director board data ports $DBDP_{1,1}$–$DBDP_{1,M}$ through $DBDP_{N,1}$–$DBDP_{N,M}$, respectively, as indicated, each one being connected to the second unit port 508 of a corresponding one of the director board transmit/receive units $504_1$–$504_8$, respectively, as shown. Each one of the director board data ports DBDPs is associated with a corresponding one of the memory boards $502_1$–$502_M$. The director board data ports $DBDP_{1,1}$–$DBDP_{1,M}$ through $DBDT_{N,1}$–$DBDP_{N,M}$ are adapted for plugging into the backplane 302.

Each one of the director boards $500_1$–$500_N$ also includes a plurality of, M, director board present/absent ports $DP/A_1$–$DP/A_M$. Thus, each one of the director board present/absent ports $DP/A_1$–$DP/A_M$ is associated with a corresponding on of the memory boards $502_1$–$502_M$.

Each one of the director boards $500_1$–$500_M$ also includes a plurality of, M, director board enable/disable ports DE/Ds. Thus, director boards $500_1$ through $500_N$ have director board enable/disable ports $DE/D_{1,1}$–$DE/D_{1,M}$ through $DE/D_{N,1}$–$DE/D_{N,M}$, respectively, as indicated. Thus, each one of the director board present/absent ports DE/Ds is associated with a corresponding on of the memory boards $502_1$–$502_M$.

Each one of the director boards $500_1$ through $500_N$ includes a decoder 514 for producing a plurality of, M, director board enable/disable signals EN accordance with present/absent signals at the plurality of director board present/absence ports $DE/D_{1,1}$–$DE/D_{1,M}$ through $DE/D_{N,1}$–$DE/D_{N,M}$, respectively, as indicated. Thus, director boards $500_1$ through $500_N$ have director board enable/disable signals EN_1,1–EN_1,M through EN_N,1–EN_N,M, respectively, at director board present/absence ports $DE/D_{1,1}$–$DE/D_{1,M}$ through $DE/D_{N,1}$–$DE/D_{N,M}$, respectively, as indicated.

Each one of the plurality of director board enable/disable signals EN_1,1–EN_1,M through EN_N, 1–EN_N,M, is fed to a corresponding one of the director board transmit/receive units $504_1$ through $504_M$ on such one of the director boards and to a corresponding one of the plurality of director board enable/disable ports $DE/D_{1,1}$–$DE/D_{1,M}$ through $DE/D_{N,1}$–$DE/D_{N,M}$, respectively, on such one of the director boards. Thus, considering director board $500_1$, for example, the plurality of director board enable/disable signals EN_1, 1–EN_1,M is fed to a corresponding one of the director board transmit/receive units $504_1$–$504_M$ on such one of the director boards $500_1$ and to a corresponding one of the plurality of director board enable/disable ports $DE/D_{1,1}$–$DE/D_{1,M}$, on such one of the director boards $500_1$.

Each one of the director board transmit/receive units $504_1$ through $504_M$ on the director board is adapted to be enabled to transmit/receive data between the first and second ports 506, 508 thereof if the director board enable/disable signal fed thereto is a predetermined voltage (i.e., the director board enable/disable signal is present) or be disabled if the director board enable/disable signal fed thereto is absent the predetermined voltage to thereby prevent transmit/receive data between the first and second ports 506, 508 thereof selectively in accordance with one of a corresponding one of the plurality of director board enable/disable signals EN_1, 1–EN_1,M through $E/D_{N,1}$–$E/D_{N,M}$, fed thereto by the decoder 514 on such one of the director boards $500_1$–$500_N$.

More particularly, the decoder 514 produces the director board enable/disable signals selectively in accordance with the presence, or absence, of the director board present/absent signals fed thereto. Each one of such director board enable/signal signals is fed to a corresponding one of the plurality of director board transmit/receive units. Each one of the director board transmit/receive units is adapted to be enabled to transmit/receive data therethrough in the presence of the director board enable/disable signal fed thereto or be disabled to prevent transmit/receive data therethrough in the absence of such director board enable/disable signal.

As noted above, the plurality of, M, memory boards $502_1$–$502_M$ provide the global memory 200 (FIGS. 1 and 2). Each one of the memory boards $502_1$ through $502_M$ is identical in construction and has a plurality of, N, memory board data ports $MDP_{1,1}$–$MDP_{N,1}$ through $MDP_{1,1}$–$MDP_{N,1}$, respectively, as shown, such memory board data ports $MDP_{1,1}$–$MDP_{N,1}$ through $MDP_{1,1}$–$MDP_{N,1}$, being adapted for being plugged into the backplane 302.

Each one of the memory board data ports $MDP_{1,1}$–$MDP_{N,1}$ through $MDP_{1,1}$–$MDP_{N,1}$, on such one of the memory boards $502_1$ through $502_M$, respectively, is associated with a corresponding director board data port $DBDP_{1,1}$–$DBDP_{1,M}$ through $DBDP_{N,1}$–$DBDP_{N,M}$, respectively, of a different one of the plurality of director boards $500_1$ through $500_N$, respectively. Thus, considering memory board $502_1$, each one of the memory board data ports $MDP_{1,1}$–$MDP_{N,1}$ thereof is associated with corresponding director board data ports $DBDT_{1,1}$–$DBDP_{N,1}$, respectively, of director boards $501_1$–$501_N$, respectively.

Each one of the memory boards $502_1$–$502_M$ includes a memory array 519, as shown for exemplary memory board $502_1$.

Each one of the memory boards $502_1$ through $502_M$ also includes a plurality of, N, memory board enable/disable ports $ME/D_{1,1}$–$ME/D_{N,1}$ through $ME/D_{1,1}$–$ME/D_{N,1}$, respectively, as shown, such memory board data ports $ME/D_{1,1}$–$ME/D_{N,1}$ through $ME/D_{1,1}$–$ME/D_{N,1}$, being adapted for being plugged into the backplane 302.

Each one of the memory board enable/disable ports $ME/D_{1,1}$–$ME/D_{N,1}$ through $ME/D_{1,1}$–$ME/D_{N,1}$, respectively, on such one of the memory boards $502_1$ through $502_M$, respectively, is associated with a corresponding director board enable/disable port $DE/D_{1,1}$–$DE/D_{1,M}$ through $DE/D_{N,1}$–$DE/DN,M$, respectively, of a different one of the plurality of director boards $500_1$ through $500_N$, respectively. Thus, considering memory board $502_1$, each one of the memory board enable/disable ports $ME/D_{1,1}$–$ME/D_{N,1}$ thereof is associated with corresponding director board data ports $DE/D_{1,1}$–$DE/D_{N,1}$, respectively, of director boards $501_1$–$50_N$, respectively. Thus, each one of the memory board enable/disable ports on such one of the memory boards is associated with a corresponding director board enable/disable port of a different one of the plurality of director boards.

Each one of the memory boards $502_1$–$502_M$ also includes a plurality of, N, memory board transmit/receive units $516_1$–$516_N$, here serial-parallel devices (i.e., SERDES) $sd_1$–$sd_N$, as shown for exemplary memory board $502_1$. Each one of the memory board transmit/receive units $516_1$–$516_N$ has a first unit port 518 connected to a corresponding one of the memory board data ports $MDP_{1,1}$–$MDP_{N,1}$ of such one of the memory boards $502_1$ and a second unit port 520 coupled to the memory array 519 on such one of the memory boards $502_1$. Each one of such memory board transmit/receive units $516_1$–$516_N$ is connected to a corresponding one of the memory board enable/disable memory ports $ME/D_{1,1}$–$ME/D_{N,1}$, respectively, of such one of the memory boards $502_1$.

Considering exemplary memory board $502_1$, as with the memory board transmit/receive units $504_1$–$504_M$ of the director boards $500_1$–$500_N$, each one of the memory board transmit/receive units $516_1$–$516_N$ thereon is adapted to be enabled to transmit/receive data between the first and second unit ports 518, 520 thereof if the enable/disable signal fed thereto has the predetermined voltage (i.e., the memory board enable/disable signal is present), or be disabled to prevent transmit/receive data between the first and second ports 518, 520 thereof if the enable/disable signal fed thereto is absent the predetermined voltage. Thus, each one of the memory board transmit/receive units $516_1$–$516_N$ for memory boards $502_1$ through $502_M$ is adapted to be enabled to transmit/receive data or be disabled to prevent transmit/receive data selectively in accordance with the one of the plurality of memory board enable/disable signals fed thereto through the one of the memory board enable/disable ports $ME/D_{1,1}$–$ME/D_{N,1}$ through $ME/D_{1,M}$–$ME/D_{N,M}$, respectively.

Each one of the memory boards $502_1$–$502_M$ includes a memory board present/absent port $P/A_1$–$P/A_M$, respectively, adapted for plugging into the backplane 302 and a circuit 526 for providing a memory board present/absent port signal $MP/A_1$–$MP/A_M$, respectively on such present/absent port $P/A_1$–$P/A_M$, respectively. Here, for example, the circuit 526 of each one of the memory boards $502_1$–$502_M$ includes a resistor 527 connected between a fixed voltage, +V, and the present/absent ports $P/A_1$–$P/A_M$ of the memory boards $502_1$–$502_M$, respectively. Thus, each one of the memory boards $502_1$–$502_M$ provides a fixed voltage, +V, at the present/absent ports $P/A_1$–$P/A_M$ of the memory boards $502_1$–$502_M$, respectively.

The backplane 302 is wired to effect a connection, for each one of the memory boards $MDP_{1,1}$–$MDP_{N,1}$ between:

(A) each one of the memory board data ports $MDP_{1,1}$–$MDP_{N,1}$ through $MDP_{1,M}$–$MDP_{N,M}$ on such one of the memory boards $502_1$–$502_M$, respectively, and the associated corresponding director board data port $DBDP_{1,1}$–$DBDP_{N,1}$ through $DBDP_{1,M}$–$DBDP_{N,M}$, respectively, of a different one of the plurality of director boards $500_1$ through $500_N$, respectively, when such one of the memory boards $502_1$–$502_M$, respectively, is plugged into the backplane 302. It is noted that memory boards data port $MDP_{1,1}$ and director board data port $DBDP_{1,1}$ carry data DT 1,1 and more generally, memory board data port $MDP_{x,y}$ and director board data port $DBDP_{x,y}$ carry data signals $DT_{x,y}$ where x is the subscript designation of the director board and y is the subscript designation of the memory board;

(B) each one of the memory board enable/disable ports $ME/D_{1,1}$–$ME/D_{N,1}$ through $ME/D_{1,M}$–$ME/D_{N,M}$ on such one of the memory boards $502_1$–$502_M$ and the associated corresponding director enable/disable ports $DE/D_{1,1}$–$DE/D_{N,1}$ through $DE/D_{1,M}$–$DE/D_{N,M}$, respectively of a different one of the plurality of director boards $500_1$ through $500_N$ when such one of the memory boards $502_1$–$502_M$, respectively, is plugged into the backplane 302. It is noted that memory board enable/disable port $ME/D_{1,1}$ and director board enable/disable port $DE/D_{1,1}$ carry enable/disable signal EN_1,2 and more generally, memory board enable/disable port $ME/D_{x,y}$ and director board enable/disable port $DE/D_{x,y}$ carry enable/disable signals EN_x,y where x is the subscript designation of the director board and y is the subscript designation of the memory board; and, (C) the memory board present/absent port $P/A_1$ through $P/A_M$ on such one of the one of the memory boards $502_1$ through $502_M$, respectively, and the director present/absent port $DP/A_1$ through $DP/A_M$, respectively, of the plurality of director boards $500_1$ through $500_N$, respectively, when such one of the memory boards $502_1$ through $502_M$, respectively, is plugged into the backplane 302. It is noted that memory board present/absent port $MP/A_1$ and director board present/absent port $DP/A_1$ carry present/absent signal $PA_1$ and more generally, memory board present/absent port $MP/A_y$ and director board present/absent port $DP/A_y$ carry present/absent $P/A_y$ where y is the subscript designation of the memory board.

Thus, considering the memory board data ports and the director board data ports and noting that the subscript designation x,y is used where x represents the director board subscript and y represents the memory board subscript, the backplane 302 is wired to provide the following connections:

Memory board data port $MDP_{1,1}$ of memory board $502_1$ is connected to director board data port $DBDP_{1,1}$ of director board $500_1$;

Memory board data port $MDP_{N,1}$ of memory board $502_1$ is connected to director board data port $DBDP_{N,1}$ of director board $500_N$;

Memory board data port $MDP_{1,2}$ of memory board $502_2$ is connected to director board data port $DBDP_{1,2}$ of director board $500_1$;

Memory board data port $MDP_{N,2}$ of memory board $502_2$ is connected to director board data port $DBDP_{N,2}$ of director board $500_N$;

Memory board data port $MDP_{1,M}$ of memory board $502_M$ is connected to director board data port $DBDP_{1,M}$ of director board $500_1$;

Memory board data port $MDP_{N,M}$ of memory board $502_M$ is connected to director board data port $DBDP_{N,M}$ of director board $500_N$;

Thus, considering now the memory board enable/disable ports and the director board enable/disable ports and noting that the subscript designation x,y is again used where x represents the director board subscript and y represents the memory board subscript, the backplane 302 is wired to provide the following connections:

Memory board enable/disable port $ME/D_{1,1}$ of memory board $502_1$ is connected to director board enable/disable $DE/D_{1,1}$ of director board $500_1$;

Memory board enable/disable port $ME/D_{N,1}$ of memory board $502_1$ is connected to director board enable/disable $DE/D_{N,1}$ of director board $500_N$;

Memory board enable/disable port $ME/D_{1,2}$ of memory board $502_2$ is connected to director board enable/disable data port $DE/D_{1,2}$ of director board $500_1$;

Memory board enable/disable port $ME/D_{N,2}$ of memory board $502_2$ is connected to director board enable/disable port $DBDP_{N,2}$ of director board $500_N$;

Memory board enable/disable $ME/D_{1,M}$ of memory board $502_M$ is connected to director board enable/disable port $DE/D_{1,M}$ of director board $500_1$;

Memory board enable/disable port $ME/D_{N,M}$ of memory board $502_M$ is connected to director board enable/disable port $DE/D_{N,M}$ of director board $500_N$.

Considering now the memory board present/absent ports and the director board present/absent ports, the backplane 302 is wired to provide the following connections:

Memory board present/absent port $P/A_1$ of memory board $502_1$ is connected to director board present absent ports $DP/A_1$ though $DP/A_N$ of director boards $500_1$ through $500_N$, respectively;

Memory board present/absent port $P/A_2$ of memory board $502_2$ is connected to director board present absent ports $DP/A_1$ though $DP/A_N$ of director boards $500_1$ through $500_N$, respectively;

Memory board present/absent port $P/A_M$ of memory board $502_M$ is connected to director board present absent ports $DP/A_1$ though $DP/A_N$ of director boards $500_1$ through $500_N$, respectively.

As noted above, each one of the memory boards $502_1$–$502_M$ provides a fixed voltage, +V, at the memory board present/absent ports $P/A_1$–$P/A_M$, respectively. If the memory boards $502_1$–$502_M$ are plugged into the backplane 302, these +V are fed as present/absent signals to the backplane 302. More particularly, when a memory board is plugged into the backplane the +V voltage at the memory board present/absent port thereof is applied as a voltage to the backplane to indicate the directors connected to the backplane 302 that such memory board is present.

On the other, it is noted if one, or more, of the of the memory boards $502_1$–$502_M$ is absent from the backplane 302, the +V voltage associated with such one, or ones, of the absent memory boards is not applied to the backplane 302. More particularly, when a memory board is absent from the backplane 302, the +V voltage at the present/absent port thereof absent from the backplane 302 and thereby indicates to the directors connected to the backplane 302 that such memory board is absent.

Thus, considering first an example where all the memory boards $502_1$–$502_M$ are plugged into the backplane 302, as shown in FIG. 5. Here, the +V voltage is coupled by the backplane 302 to the director board present/absent ports $DP/A_1$–$DP/A_M$ of director boards $500_1$–$500_N$. The decoders 514 in such director boards $500_1$–$500_N$ in response to the, M, +V voltages at the director board present/absent ports $DP/A_1$–$DP/A_M$ of director boards $500_1$–$500_N$, produce enable signals on the director board enable/disable ports $DE/D_{1,1}$–$DE/D_{1,M}$ through $DE/D_{N,1}$–$DE/D_{N,M}$, and on the memory board enable/disable ports $ME/D_{1,1}$–$ME/D_{N,1}$ through $ME/D_{1,M}$–$ME/D_{N,M}$. Thus, when all the memory boards are plugged into the backplane 302, all director board transmit/receive units $504_1$–$504_M$ of the director boards $500_1$–$500_N$ pass data therethrough and all memory board transmit/receive units $516_1$–$516_N$ of memory boards $502_1$–$502_M$ pass data therethrough.

Figure 5A:
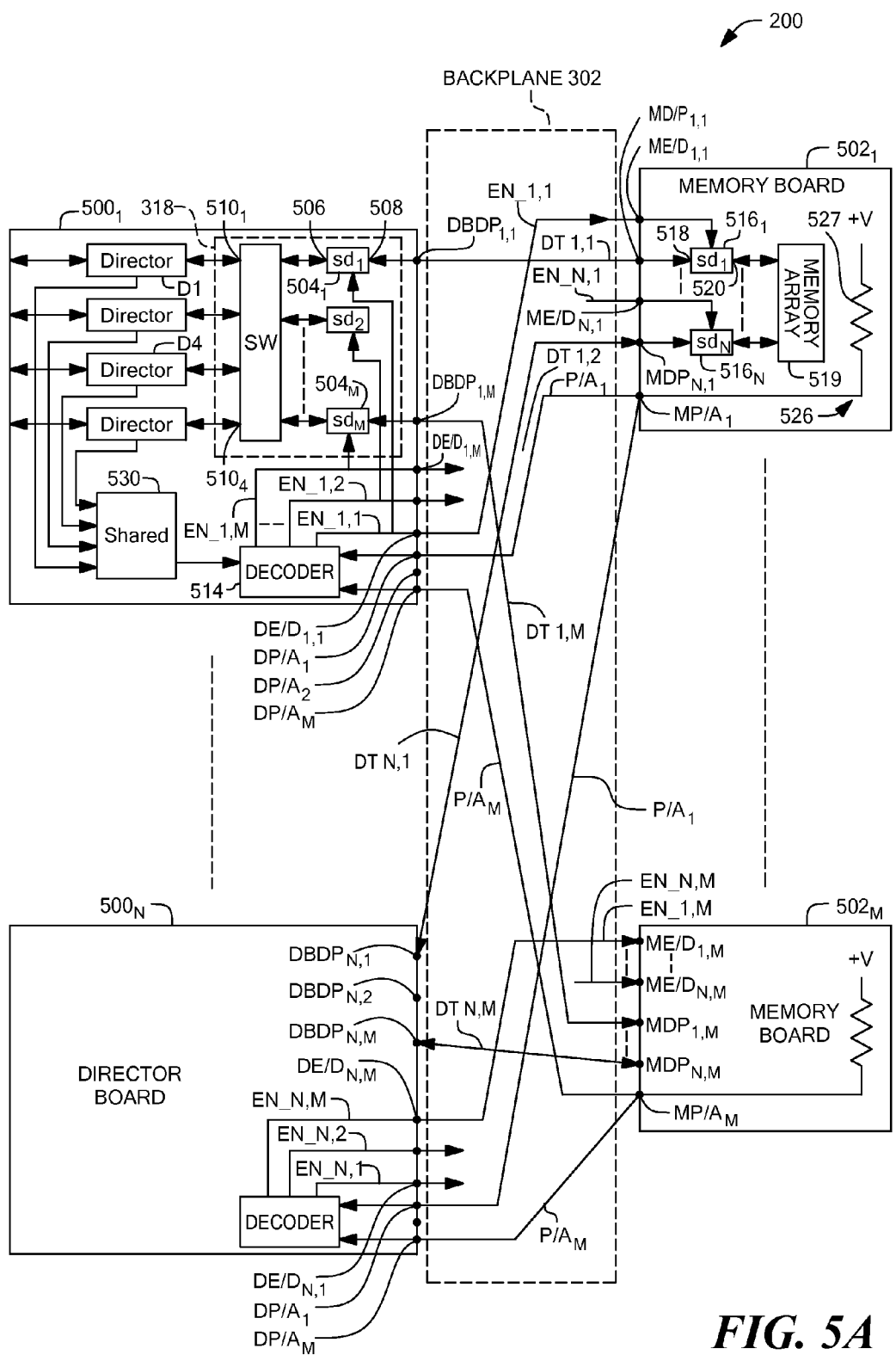
FIG. 5A is a diagram of the system of FIG. 5 with one of the memory boards absent from the backplane.

Now, consider an example where one of the memory boards $502_1$–$502_M$, in FIG. 5 here, for example, memory board $502_2$ is absent from the backplane 302, as shown in FIG. 5A. Here, the +V voltage at memory board present/absent port $P/A_2$ is removed from the backplane 302 and thus removed from the director board present/absent ports $DP/A_2$ of all the director boards $500_1$–$500_N$. The decoders 514 in such director boards $500_1$–$500_N$ in response to the missing +V voltages at the director board present/absent ports $DP/A_2$ of director boards $500_1$–$500_N$, the director board enable/disable signals is absent on the director board enable/disable ports $DE/D_{1,2}$ through $DE/D_{N,2}$–$DE/D_{N,2}$. Thus, here the director board transmit/receive units $504_1$ and $504_3$–$504_M$ of the director boards $500_1$–$500_N$ pass data therethrough whereas the transmit/receive units $504_2$ of memory boards $502_1$–$502_M$ are prevented from passing data therethrough.

Thus, in the absence of director board present/absent signal the decoders on the plurality of director boards do not produce enable signals on the director board enable/disable ports thereof which are associated with such absent one of the memory boards. The absence of the enable signals, disables the director board transmit/receive units connected to the director board data ports associated with such absent one of the memory boards.

Figure 5B:
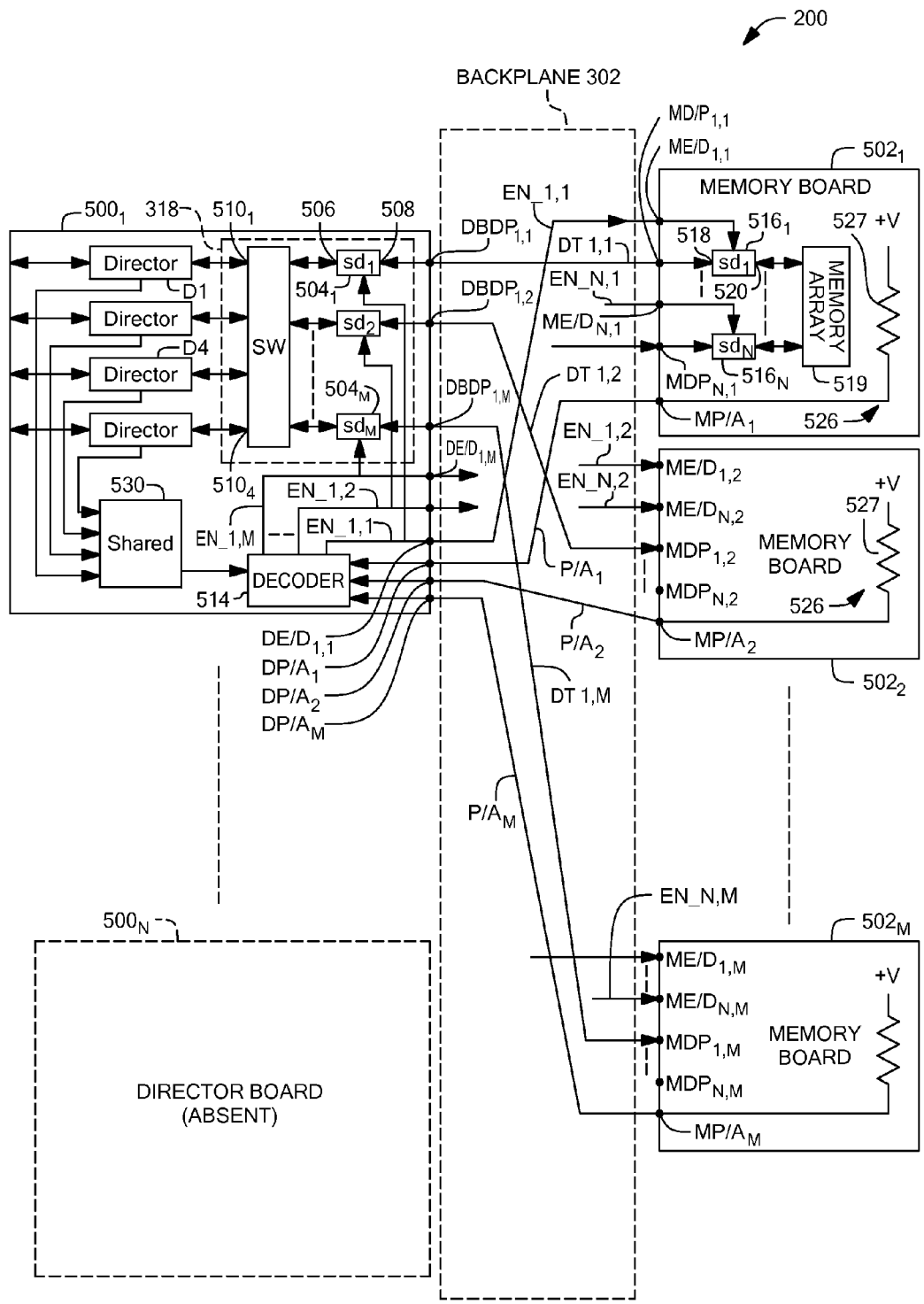
FIG. 5B is a diagram of the system of FIG. 5 with one of the director boards absent from the backplane.

Now, consider an example where one of the director boards $500_1$–$500_M$, in FIG. 5 here, for example, director board $500_M$ is absent from the backplane 302, as shown in FIG. 5B, it being noted that the absent director board 500M is shown in phantom, i.e., as a dotted block. Here, the predetermined voltages at director board enable/disable ports $DE/D_{N,1}$–$DE/D_{N,M}$ are absent from the backplane 302. Thus, the enable/disable signals at memory board enable/disable ports $ME/D_{N,1}$ through $ME/D_{N,M}$ are removed from memory boards $502_1$–$502_M$. Therefore, the memory board transmit/receive units $516_N$ of each one of the memory boards $502_1$–$502_M$ therefore are disabled. Thus, in the absence of the memory board enable/disable signal, i.e., the predetermined voltage, on one or more of the plurality of director boards $500_1$–$500_2$ the memory board transmit/receive units $516_1$–$516_N$ associated with such one, or ones of the absent director boards are disabled.

Referring again to FIG. 5, each one of the director boards $500_1$–$500_N$ includes a shared unit 530. The shared unit 530 is fed by each one of the directors on the director board. With such shared unit 530, extra software control may be used to allow a director to completely turn off, i.e., disable, all of it's director board transmit/receive units $504_1$–$504_M$ to the backplane 302 along with the associated memory board transmit/receive units $516_1$–$516_N$ before being removed. Further the software can disable or enable all or some selected ports. This insures that at no time is a director board or memory board transmitting on an un-terminated data channel (i.e., data port DBDP or MDP). This software control could also be used to enable a channel where the pull-up signal (i/e., +V) from the memory board is not present. This could be useful in the case of a fault with the pull-up signal specifically or some device is in use that lacks this pull-up.

A number of embodiments of the invention have been described. Nevertheless, it will be understood that various modifications may be made without departing from the spirit and scope of the invention. Accordingly, other embodiments are within the scope of the following claims.

What is claimed is:

1. A data storage system for transferring data between a host computer/server and a bank of disk drives through a system interface, comprising:
    (A) a backplane adapted to have plugged therein a plurality of director boards and a plurality of memory boards; wherein:
    (B) each one of such director boards, comprises:
        a plurality of director board transmit/receive units, each one of the director board transmit/receive units being associated with a corresponding one of the plurality of memory boards, each one of the director board transmit/receive units being adapted to be disabled in the absence of the one of the memory boards associated with such one of the director board transmit/receive units;
    (C) each one of the memory boards having:
        a plurality of memory board transmit/receive units, each one of the memory board transmit/receive units being associated with a corresponding one of the plurality of director boards, each one of the memory board transmit/receive units being adapted to be disabled to prevent transmit/receive data therethrough in the absence of the one of such director boards associated with such one of the memory board transmit/receive units.

2. The system recited in claim 1 wherein the director board transmit/receive units and the memory board transmit/receive units are SerDes.

3. A data storage system for transferring data between a host computer/server and a bank of disk drives through a system interface, such system interface having a plurality of directors and a global memory, comprising:
    (A) a backplane adapted to have plugged therein a plurality of director boards having the plurality of directors and a plurality of memory boards providing the global memory; wherein:
    (B) each one of such director boards, comprises:
        a plurality of director board transmit/receive units, each one of the units being associated with a corresponding to one of the plurality of memory boards;
        a decoder, responsive to a plurality of director board present/absent signals fed thereto, each one of the plurality of director board present/absent signals being associated with a corresponding one of the memory boards, such decoder producing each one of a plurality of director board enable/disable signals selectively in accordance with the presence, or absence, of the director board present/absent signal, each one of such director board enable/signal signals being fed to a corresponding one of the plurality of director board transmit/receive units, each one of the director board transmit/receive units being adapted to be enabled to transmit/receive data therethrough in the presence of the director board enable/disable signal fed thereto or be disabled to prevent transmit/receive data therethrough in the absence of such director board enable/disable signal;
    (C) each one of the memory boards having:
        a plurality of memory board transmit/receive units, each one of the units being associated with a corresponding one of the plurality of director boards, each one of the memory board transmit/receive units being adapted to be enabled to transmit/receive data therethrough in the presence of a memory board enable/disable signal fed thereto or be disabled to prevent transmit/receive data therethrough in the absence of such memory board enable/disable signal;
        a circuit for providing a corresponding one of the memory board present/absent signal;
    (D) wherein when one, or ones, of the memory boards is plugged into the backplane, the memory board present/absent signal provided by such plugged memory board is passed through the backplane to the decoders of such associated one, or ones, of the director boards to produce the director board enable/disable signals for the director board transmit/receive units associated with such one, or ones, of the memory boards, and when one, or ones, of the memory boards is absent from the backplane, the memory board present/absent signal associated with such one, or ones, of the memory board is absent from the backplane; and
    (E) wherein in the absence of memory board present/absent signal, the decoders on the plurality of director boards remove director board enable/disable signals to disable the director board transmit/receive units associated with the absent one, or ones, of the plurality of memory boards;
    (F) wherein when one of the director boards is plugged into the backplane, the director board enable/disable signals provided by such plugged director board are passed through the backplane to the memory board transmit/receive units of the memory boards to provide the memory board enable/disable signals for the transmit/receive units on such memory boards and when one, or ones, of the director boards is absent from the backplane, the director board enable/disable signal associated with such absent one, or ones, of the director boards is absent from the backplane; and
    (E) wherein in the absence of director board enable/disable signal from the absent one, or ones, of the director board, the memory board enable/disable signal is absent from the memory board transmit/receive units associated with the absent one, or ones, of the director boards.

4. The system recited in claim 3 wherein the director board transmit/receive units and the memory board transmit/receive units are SerDes.

5. The system recited in claim 3 wherein the circuit comprises a resistor connected between the memory board present/absent port and a predetermined voltage.

6. The system recited in claim 5 wherein the director board transmit/receive units and the memory board transmit/receive units are SerDes.

7. A data storage system for transferring data between a host computer/server and a bank of disk drives through a system interface, such system interface having a plurality of directors and a global memory, comprising:

(I) a backplane adapted to have plugged therein a plurality of, N, director boards and a plurality of, M, memory boards;
  (A) each one of such director boards, comprising:
    (a) a plurality of the directors;
    (b) a plurality of, M, director board transmit/receive units, each one of the units having a first unit port and a second unit port;
    (c) a crossbar switch having:
      (i) a plurality of first switch ports, each one of the first switch ports being coupled to a corresponding one of the directors on such one of the director boards; and
      (ii) a plurality of, M, second switch ports, each one of the second switch ports being coupled to the first unit port of a corresponding one of the transmit/receive units on such one of the director boards;
    (d) a plurality of, M, director board data ports, each one being connected to the second unit port of a corresponding one of the director board transmit/receive units on such one of the director boards, such director board data ports being adapted for plugging into the backplane;
    (e) a plurality of, M, director board present/absent ports such present/absent ports being adapted for plugging into the backplane;
    (f) a plurality of, M, director board enable/disable ports such director board enable/disable ports being adapted for plugging into the backplane;
    (g) a decoder for producing a plurality of, M, enable/disable signals in accordance with present/absent signals at the plurality of director board present/absence ports, each one of the plurality of enable/disable signals being fed to a corresponding one of the director board transmit/receive units on such one of the director boards and to a corresponding one of the plurality of director board enable/disable ports on such one of the director boards; and
    (f) wherein each one of the director board transmit/receive units on such one of the director boards is adapted to be enabled to transmit/receive data between the first and second ports thereof or be disabled to prevent transmit/receive data between the first and second ports thereof selectively in accordance with one of a corresponding one of the plurality of enable/disable signals fed thereto by the decoder on such one of the director boards;
  (B) the plurality of, M, memory boards providing the global memory, each one of the memory boards having:
    (a) a plurality of, N, memory data ports adapted for being plugged into the backplane, each one of the memory data ports on such one of the memory boards being associated with a corresponding director board data port of a different one of the plurality of director boards;
    (b) a memory array;
    (c) a plurality of, N, memory board enable/disable ports, each one of the memory enable/disable ports on such one of the memory boards being associated with a corresponding director enable/disable port of a different one of the plurality of director boards, such memory board enable/disable ports being adapted for plugging into the backplane;
    (d) a plurality of, N, memory board transmit/receive units each one having a first unit port connected to a corresponding one of the memory data ports of such one of the memory boards and a second unit port coupled to the memory array on such memory boards, each one of such memory board transmit/receive units being connected to a corresponding one of the memory board enable/disable memory ports, each one of the memory board transmit/receive units being is adapted to be enabled to transmit/receive data between the first and second unit ports thereof or be disabled to prevent transmit/receive data between the first and second ports thereof selectively in accordance with the one of the plurality of enable/disable signals fed thereto through the one of the memory board enable/disable ports connected thereto;
    (c) a memory board present/absent port adapted for plugging into the backplane;
    (d) a circuit for providing a present/absent port signal on such present/absent port;
  (II) wherein the backplane is wired to effect a connection, for each one of the memory boards, between:
    (A) each one of the memory data ports on such one of the memory boards and the associated corresponding director board data port of a different one of the plurality of director boards when such one of the memory boards is plugged into the backplane;
    (B) each one of the memory enable/disable ports on such one of the memory boards and the associated corresponding director enable/disable ports of a different one of the plurality of director boards when such one of the memory boards is plugged into the backplane;
    (C) the present/absent port on such one of the one of the memory boards and the director present/absent port of the plurality of director boards when such one of the memory boards is plugged into the backplane;
    (D) wherein the present/absent signal produced on such one of the memory boards is fed to the backplane when such one of the memory boards is plugged into the backplane, such present/absent signal being absent from such backplane and therefore from the corresponding one of the director present/absent port of the plurality of director boards when such one of the memory boards is un-plugged from such back plane; and
    (E) wherein in the absence of present/absent signal the decoders on the plurality of director boards produce disable signals on the director board enable/disable ports thereof associated with such absent one of the memory boards; and
    (F) wherein such disable signals disables the director board transmit/receive units connected to the director board data ports associated with such absent one of the memory boards.

* * * * *